INVENTOR.
JOHN H. INGMANSON
BY
Blair & Buckles
ATTORNEYS.

United States Patent Office 3,324,229
Patented June 6, 1967

3,324,229
RETRACTILE CORD HAVING A VULCANIZED ETHYLENE-PROPYLENE-DIENE TERPOLYMER JACKET
John H. Ingmanson, New Haven, Conn., assignor to The Whitney Blake Company, New Haven, Conn.
Filed Nov. 4, 1963, Ser. No. 321,008
2 Claims. (Cl. 174—69)

This application relates to an electrical cord jacketing composition which is durable under extreme ambient conditions and which possesses resiliency characteristics which make the composition useful as a jacketing material for retractile cords, and to a retractile cord having a jacket of such a composition.

Aging and cracking of the protective jackets of communication cables and cords is a serious problem. Not only is the dielectric constant of the protective or insulating jacket altered, but the reliability of the cable itself is substantially reduced. The resiliency of the jacketing material is also important when used for retractile cords, which are generally helically formed for use with communication instruments such as telephone handsets. If loss of resiliency of the cord jacket occurs, an important property of the retractile cord is negated, and the cord will be permanently distended. One of the principal causes of retractile cord aging is the presence of atmospheric ozone which attacks the double bonds of the elastomer comprising the cable jacket. Ozone aging of elastomers also seriously affects the resiliency of the composition.

Ozone is not the only aging or deteriorating factor for elastomer jackets since extremes of temperature, sunlight, oils, or perspiration can also affect the jacket properties. The problems of aging and extreme temperature degradation of communications' jackets are particularly pronounced in military applications.

Retractile cords used for communications in the Arctic and sub-Arctic or in aircraft, for example, are subjected to a substantial amount of atmospheric ozone and extremes of temperature. Thus cracking and aging of cord jackets reduces reliability of the cords and substantially shortens their useful life. Jacketing compositions which are used for military purposes must have great durability under exposure to ozone and to extremes of temperature. In the case of a jacketing composition for retractile cords, the composition should retain good retractile properties under such severe environmental conditions.

Accordingly, it is an object of the invention to provide a jacketing composition for communication lines.

Another object of the invention is to provide a jacketing composition of the above character which may be used in making retractile cords.

A further object of the invention is to provide a jacketing composition of the above character which resists extreme environmental conditions.

Another object of the invention is to provide a jacketing composition of the above character which is inexpensive to compound and process.

A further object of the invention is to provide a retractile cord having a jacket made of the composition of the above character.

Other objects of the invention will in part be obvious and will in part appear hereinafter.

The invention accordingly comprises an article of manufacture and a composition of matter possessing the features, characteristics, properties, and the relation of constituents which will be exemplified in the composition hereinafter described, and the scope of the invention will be indicated in the claims.

For a fuller understanding of the nature and objects of the invention, reference should be had to the following detailed description taken in connection with the accompanying drawing, in which.

Figure 1:
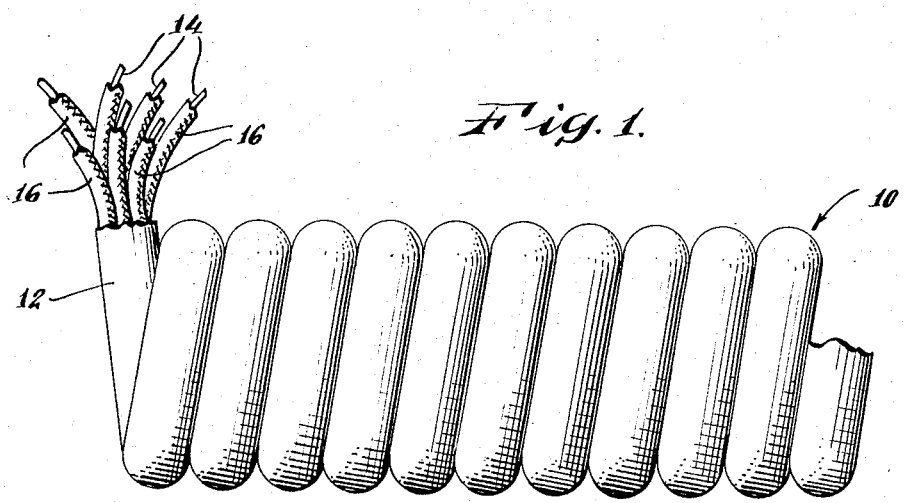
FIGURE 1 is a fragmentary side view of a retractile cord made in accordance with the invention.
Figure 3:
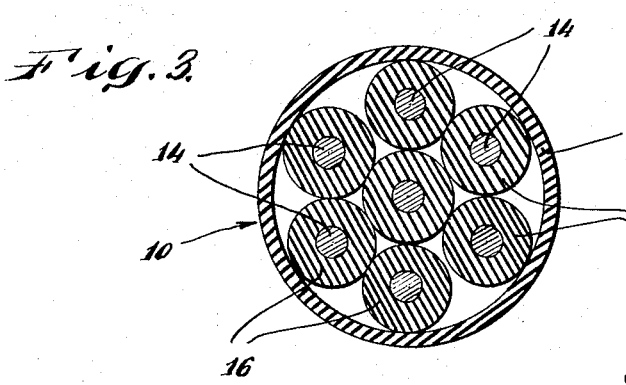
FIGURE 3 is an end sectional view of the retractile cord.

As shown in FIGURES 1 and 3, the retractile cord 10 of the invention is helically formed and comprises a jacket 12 which closely surrounds a group of conductors 14 which are covered by primary insulation 16. The jacket 12 provides protection for the primary insulation 16 and the retractile properties of the cord.

Figure 2:
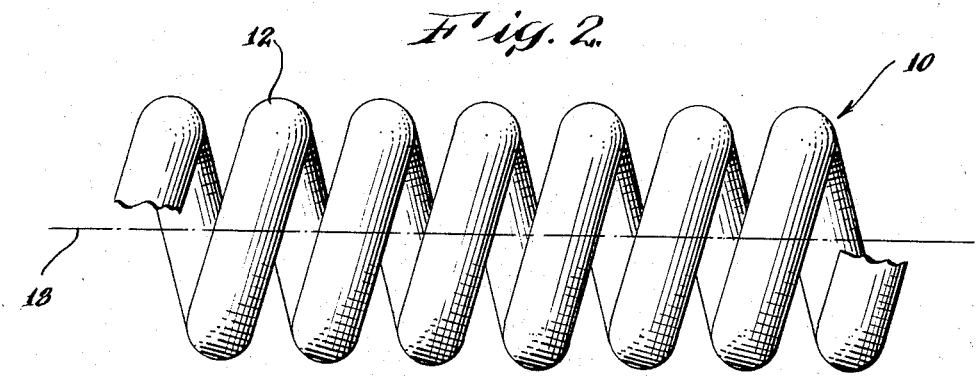
FIGURE 2 is a fragmentary side view of a retractile cord made in accordance with the invention and partially extended.

As shown in FIGURE 2, the retractile cord 10 is extended during use to expand the cord length along its helical axis 18. Upon retraction of the cord the elastomeric properties of the jacket 12 returns the cord to a tight helix as shown in FIGURE 1.

Aging and cracking of the jacket 12 permits moisture, ozone and oxygen to attack and deteriorate the primary insulation 16 and to alter the insulation dielectric properties and the reliability of the cord. Aging of the jacket 12 also tends to destroy its resilient properties, and the cord will not retract but will remain in an extended condition when not in use. Thus aging and cracking of the cord jacket 12 defeats both of the purposes of the jacket.

Among the several compositions heretofore used for retractile cord jackets is a combination of styrene-butadiene synthetic rubber (SBR) and natural rubber. The principal prior art elastomer for use on retractile cords for military use has been an SBR-natural rubber. Such a jacketing compound has been found to be subject to ozone aging and is only moderately resistant to deterioration when exposed to weather or temperature extremes. A retractile cord jacket made in accordance with the invention has been tested in comparison with SBR-natural rubber cord jackets for aging and resiliency characteristics. The test results are shown hereinafter.

In general, the jacket material of my invention is compounded with a base material of ethylene-propylene rubber which is polymerized with a small amount of a suitable unsaturated third monomer which is preferably a non-conjugated diene. The terpolymer of ethylene, propylene and the diene generally comprise about 35 percent by weight of the composition with the remainder of the jacketing composition being comprised of re-enforcing materials such as carbon black with appropriate activators, accelerators, plasticizer and crosslinking constituents as will be more fully described hereinafter.

The terpolymer base should comprise from 45 to 75 percent propylene with the remainder of the base material being ethylene and the non-conjugated diene. The non-conjugated diene should comprise less than 10% of the terpolymer base material by weight, preferably from 1–3% by weight to provide optimum retractile properties and yet be highly resistant to oxidation or ozone attack.

Activators such as stearic acid and zinc oxide, fillers such as carbon black, one or more plasticizers, accelerators, and crosslinking constituents are also included in the composition as will be more fully described hereinafter.

The invention will now be described with more particularity. Each 100 parts by weight of terpolymer base material consists of about 60% propylene, less than 10% of a non-conjugated diene such as dicyclopentadiene, and about 35% ethylene. It has been found that a terpolymer base material of 45 to 75% propylene, 1 to 3% of a non-conjugated diene with the remainder being ethylene provides the desired retractile and aging-resistant characteristics of a good retractile cord jacket when compounded in accordance with the invention.

To each 100 parts of terpolymer base material, it has been found preferable to add 4 to 12 parts activator, preferably comprising .5 to 2 parts of stearic acid, and 3.5 to 10 parts zinc oxide. From 50 to 200 parts of carbon black filler with 20 to 100 parts of a light oil plasticizer are added to provide low compression set with high resiliency in a composition having sufficient tensile strength. With the use of carbon black as a filler, the light oil, which should be a napthenic or paraffinic base petroleum oil, provides improved processing characteristics and enhances extrusion of the jacketing composition in forming a retractile cord. Fillers such as whiting, clay, silica or titanium dioxide may also be used, but such fillers are either more expensive and/or more difficult to extrude than the preferred carbon black.

From 1 to 3 parts of sulfur as a crosslinking or vulcanizing agent, alone or in combination with a promoter is preferred. About 1 part of a promoter such as p-quinone dioxime is used during high temperature mixing to promote the crosslinking action of the sulfur. From 1 to 3 parts accelerator is used, which is preferably a combination of synergistic accelerators. Such accelerators are preferably tetramethylthiuram monosulfide in combination with 2-mercaptobenzothiazole.

The above constituents are mixed according to standard compounding practices in a Banbury mixer. After thorough mixing and compounding, the composition is then heated and extruded around a core of insulated communications conductors. The retractile cord shown in FIGURES 1–3 may be made, for example, substantially in accordance with U.S. Patent No. 3,038,021.

The following example is illustrative of the invention:

EXAMPLE I

| | Parts | Percent by Weight |
|---|---|---|
| Terpolymer Base | 100.00 | 35.030 |
| Stearic Acid | 1.00 | 0.350 |
| Zinc Oxide | 5.00 | 1.750 |
| FEF Carbon Black (fast extrusion furnace type) | 125.00 | 43.785 |
| Circo Light Oil (napthenic base) | 50.00 | 17.510 |
| p-Quinone-dioxime | 1.00 | 0.350 |
| Sulfur | 1.50 | .525 |
| Tetramethylthiuram Monosulfide | 1.50 | .525 |
| MBT 2-mercaptobenzothiazole | 0.50 | .175 |
| | 285.50 | 100.000 |

The compound shown in Example I was prepared in a Banbury mixer and extruded onto a core of insulated conductors and formed into a retractile cord. Lengths of the material were vulcanized in saturated steam for 10 minutes at a steam pressure equivalent to 315° Fahrenheit. Specimens were also cut from the cured retractile cord jackets and evaluated for physical properties. Specimens of the material were then tested in comparison with a prior art SBR-natural rubber compound with results as follows:

TABLE A.—COMPARATIVE PHYSICAL PROPERTIES

| | Example I Compound | SBR-Natural Rubber Compound |
|---|---|---|
| Tensile Strength, lbs. per sq. in | 2,328 | 2,405 |
| Elongation at Break, percent | 340 | 250 |
| Tensile Stress at 200 percent Elongation | 1,525 | 1,983 |

TABLE B.—RESISTANCE TO AGING

| | Example I Compound | SBR-Natural Rubber |
|---|---|---|
| After Accelerated Aging at 70° C. for 96 hours in oxygen at 300 pounds pressure: | | |
| Tensile Strength, lbs. per sq. in | 2,467 | 2,463 |
| Elongation at Break, percent | 297 | 237 |

TABLE C.—IMPACT BRITTLENESS TEMPERATURE

| | Example I Compound, °C. | SBR-Natural Rubber, °C. |
|---|---|---|
| Specimens from Cord Jackets | −68.5 | −60.5 |

TABLE D.—RESISTANCE TO OILS

| | Example I Compound | SBR-Natural Rubber |
|---|---|---|
| After Immersion in Light Petroleum Oil 4 hours at 70° C.: | | |
| Tensile Strength Retained, percent | 83 | 63 |
| Elongation Retained, percent | 75 | 83 |
| Volume Increase, percent | 4 to 5 | 1 to 3.5 |
| After Immersion in Lard 7 days at 50° C. (This is a test of resistance to excretions from hands): | | |
| Tensile Strength Retained, percent | 108 | 71 |
| Elongation Retained, percent | 103 | 82 |

TABLE E.—RETRACTILE CORD STATIC LOAD TEST (RETRACTIVE MEMORY)

[Cords suspended freely and loaded to 250 percent of normal retracted length. Load required was about 150 grams. Length measured after 15 minutes and again after 2 days. Temperature 75° F.]

| Jacket Compound | Example I Compound | SBR-Natural Rubber |
|---|---|---|
| Original Retracted Length, Inches, Average | 8¼ | 9⅛ |
| After 15 Minutes, Percent of Original Elongation | 250 | |
| After 2 Days, Percent of Original Elongation | 289 | 261 |

TABLE F.—RETRACTILE CORD STATIC LOAD TEST (RETRACTIVE MEMORY)

[Load removed after 2 days, cords placed horizontally on flat surface and length measured after several elapsed time periods to determine rate of recovery.]

| Jacket Compound | Example I Compound | SBR-Natural Rubber |
|---|---|---|
| Percent of Original Length after ½ Minute | 102 | 103 |
| Percent of Original Length after 1 Minute | 101 | 100 |
| Percent of Original Length after 5 Minutes | 101.5 | 100 |
| Percent of Original Length after 10 Minutes | 101 | 100 |
| Percent of Original Length after 30 Minutes | 101 | 100 |
| Percent of Original Length after 60 Minutes | 100 | 100 |

TABLE G.—LOAD TO EXTEND RETRACTILE CORDS BEFORE AND AFTER ACCELERATED AGING

[Cords aged in circulating air oven at 121° C. Loads are given in ounces.]

| Elongation | Example I Compound | | | | SBR-Natural Rubber | | | |
|---|---|---|---|---|---|---|---|---|
| | 2:1 | 3:1 | 4:1 | 5:1 | 2:1 | 3:1 | 4:1 | 5:1 |
| Before Aging | 8.8 | 13.3 | 18.0 | 21.5 | 7.3 | 10.2 | 14.2 | 17.8 |
| After Aging 3 Days | 20.0 | 32.2 | 45.2 | | 6.9 | 12.1 | 16.8 | 22.0 |
| After Aging 4 Days | 20.7 | 34.7 | 46.7 | | 7.2 | 11.9 | 16.7 | 23.0 |
| After Aging 5 Days | 22.7 | 37.7 | 52.0 | | 6.2 | 10.7 | 15.5 | 23.7 |
| After Aging 10 Days | 34.0 | 49.7 | 75.0 | | 9.8 | 16.7 | 26.3 | 38.0 |

TABLE H.—LOAD TO EXTEND RETRACTILE CORDS AND DEGREE OF RETRACTION UNDER EXTREME COLD

| | Example I Compound | SBR-Natural Rubber |
|---|---|---|
| 20 Hours at −65° F.: | | |
| Original Retracted Length, inches | 6 | 6 |
| Load to Extend 5:1, pounds | 9 | 4 |
| Retraction 1 Minute after Load Removal, Percent of Original Length | 110 | 102 |
| 20 Hours at −80° F.: | | |
| Original Retracted Length, inches | 6 | 6 |
| Load to Extend 5:1, pounds | 17 | 11 |
| Retraction 1 Minute after Load Removal, Percent of Original Length | 119 | 117 |

TABLE I.—OZONE RESISTANCE

| | Example I Compound | SBR-Natural Rubber |
|---|---|---|
| Exposed at 75° F. in air with ozone content 0.03 percent by volume. | No cracks after 76¾ hours. | Cracks in 10 minutes. |

NOTE.—A neoprene jacketing compound cracked after 2 hours exposure.

As indicated by the above tests, an elastomer composition in accordance with the invention is very resistant to oxidation or ozone aging and is very weather-resistant for use in exposed applications or under extreme ambient conditions. When used for a retractile cord jacket, the composition of the invention has a good elastic memory and maintains its elasticity under varying and severe environmental conditions. Further, compositions according to the invention can be extruded and otherwise processed at least as well as the SBR-natural rubber jacketing compound now in use for retractile cords for heavy duty use such as by the military. The retractile cord jacketing material made in accordance with the invention is not only superior to prior art compositions in a number of respects but is also economically practicable for such uses.

It will thus be seen that the objects set forth above, among those made apparent from the preceding description, are efficiently attained and, since certain changes may be made in the above article and in the composition of matter without departing from the scope of the invention, it is intended that all matter contained in the above description shall be interpreted as illustrative and not in a limiting sense.

Particularly it is to be understood that in said claims, ingredients or compounds recited in the singular are intended to include compatible mixtures of such ingredients wherever the sense permits.

It is also to be understood that the following claims are intended to cover all of the generic and specific features of the invention which, as a matter of language, might be said to fall therebetween.

Having described my invention, what I claim as new and desire to secure by Letters Patent is:

1. A retractile electrical cord comprising, in combination, at least one electrical conductor and an elastomeric jacket formed around said conductor, said cord being formed in a helical configuration and said jacket having a composition comprising the cured product of:
   (A) a terpolymer base material composed by weight of
       (1) from 45% to 75% propylene
       (2) from 1% to 3% of a non-conjugated diene, and
       (3) the remainder ethylene,
   100 parts by weight of said base material being compounded with
   (B) from 50–200 parts by weight carbon black,
   (C) from 20 to 100 parts by weight of plasticizer taken from the group consisting of
       (1) a napthenic base petroleum oil and
       (2) a paraffinic base petroleum oil,
   (D) from 4 to 12 parts by weight of activator taken from the group consisting of
       (1) zinc oxide and
       (2) stearic acid,
   (E) from 1 to 3 parts by weight of sulfur, and
   (F) from 1–3 parts by weight of accelerator taken from the group consisting of
       (1) tetramethythiuram monosulfide and
       (2) 2-mercaptobenzothiazole.

2. A retractile electrical cord comprising, in combination, at least one electrical conductor and an elastomeric jacket formed around said conductor, said cord being formed in a helical configuration and said jacket having a composition comprising the cured product of:
   (A) a terpolymer base material composed by weight of
       (1) from 45% to 75% propylene,
       (2) from 1% to 3% of a non-conjugated diene, and
       (3) the remainder ethylene,
   about 100 parts by weight of said base material being compounded with
   (B) about 125 parts by weight of carbon black,
   (C) about 50 parts by weight of plasticizer taken from the group consisting of
       (1) a napthenic base petroleum oil and
       (2) a paraffinic base petroleum oil,
   (D) about 5 parts by weight of zinc oxide,
   (E) about 1 part by weight of stearic acid,
   (F) about 1.5 parts by weight of sulfur,
   (G) about 1 part by weight of p-quinone dioxime,
   (H) about 1.5 parts by weight of tetramethylthiuram monosulfide, and (I) about .5 part by weight of 2-mercaptobenzothiazole.

References Cited

UNITED STATES PATENTS

| 2,933,480 | 4/1960 | Gresham et al. | 260—80.5 |
| 3,000,866 | 9/1961 | Tarney | 260—80.5 |
| 3,038,021 | 6/1962 | Larson | 260—41.5 |

OTHER REFERENCES

Schoenbeck: Rubber Chemistry and Technology, vol. 35 (1962), pp. 1142–1144, 1151, 1152, 1153, 1155, copy in S.L., TS1870R75.

DONALD E. CZAJA, *Primary Examiner*.

LEON J. BERCOVITZ, *Examiner*.

R. A. WHITE, *Assistant Examiner*.